(12) United States Patent
Mejia et al.

(10) Patent No.: US 12,394,980 B1
(45) Date of Patent: Aug. 19, 2025

(54) REAL TIME AI/IOT DYNAMICS ECONOMICS MODELING FOR RENEWABLE ENERGY GENERATION AND MANAGEMENT

(71) Applicant: Enovate AI Corporation, The Woodlands, TX (US)

(72) Inventors: Camilo Mejia, Houston, TX (US); Rebecca Nye, London (GB); Meisong Yan, Houston, TX (US); Oscar Martinez, Bogota (CO)

(73) Assignee: Enovate AI Corporation, The Woodlands, TX (US)

( * ) Notice: Subject to any disclaimer, the term of this patent is extended or adjusted under 35 U.S.C. 154(b) by 0 days.

(21) Appl. No.: 18/944,842

(22) Filed: Nov. 12, 2024

(51) Int. Cl.
| | |
|---|---|
| *H02J 3/00* | (2006.01) |
| *G06Q 10/0631* | (2023.01) |
| *G06Q 50/06* | (2024.01) |
| *H02J 3/38* | (2006.01) |
| *H02S 10/12* | (2014.01) |

(52) U.S. Cl.
CPC .......... *H02J 3/003* (2020.01); *G06Q 10/0631* (2013.01); *G06Q 50/06* (2013.01); *H02J 3/004* (2020.01); *H02J 3/381* (2013.01); *H02S 10/12* (2014.12); *H02J 2203/20* (2020.01); *H02J 2300/10* (2020.01); *H02J 2300/26* (2020.01); *H02J 2300/28* (2020.01)

(58) Field of Classification Search
CPC .. H02J 3/003; H02J 3/004; H02J 3/381; H02J 2300/28; H02J 2300/10; H02J 2203/20; H02S 10/12; G06Q 10/0631; G05Q 50/06

USPC ......................................................... 700/291
See application file for complete search history.

(56) References Cited

U.S. PATENT DOCUMENTS

| | | | | |
|---|---|---|---|---|
| 2011/0231028 A1* | 9/2011 | Ozog | ...................... | H02J 3/14 700/291 |
| 2017/0005515 A1* | 1/2017 | Sanders | ................... | H02J 3/388 |
| 2019/0147551 A1* | 5/2019 | Sun | ......................... | H02J 3/008 700/291 |
| 2023/0115235 A1* | 4/2023 | Shono | ..................... | G01W 1/10 700/291 |

(Continued)

OTHER PUBLICATIONS

E. Deming, et al. "Real-Time Scheduling—with Renewable Energy", APJEE, v. 8, No. 2, 2021 (Year: 2021).*

*Primary Examiner* — Md Azad
(74) *Attorney, Agent, or Firm* — DLA PIPER LLP (US)

(57) ABSTRACT

A system for real-time economic modeling and optimization for integrated power generation and distribution. The system comprising a data collection module configured to collect real-time multi-frequency data from multiple energy sources and IoT sensors, an integration module configured to integrate the collected data with energy production cost components and market information and weather information from external data sources, an analysis module comprising a physics-based model and a machine learning model, configured to analyze the integrated data, calculate real-time Levelized Cost of Energy (LCOE) based on current operational expenditure (OPEX) and market conditions, predict profitability, and assess risk, and a recommendation module configured to generate operational adjustment recommendations for the energy production based on at least one of the LCOE and predicted profitability.

20 Claims, 8 Drawing Sheets

(56) References Cited

U.S. PATENT DOCUMENTS

2023/0246437 A1* 8/2023 Cella .................. H04L 41/0833
           700/291
2023/0368093 A1* 11/2023 Gupta .................... G06Q 50/06

* cited by examiner

REAL TIME AI/IOT DYNAMICS ECONOMICS MODELING FOR RENEWABLE ENERGY GENERATION AND MANAGEMENT

FIELD

The present disclosure generally relates to real-time AI/IoT dynamics economics modeling for renewable electricity generation. This system may integrate artificial intelligence and Internet of Things technologies to provide dynamic economic modeling and optimization for renewable energy production and carbon management, enabling more efficient and profitable operations in the rapidly evolving energy sector.

BACKGROUND

The energy sector has undergone significant transformations in recent years, with a growing emphasis on renewable energy sources and smart grid technologies. Traditional power generation and distribution systems are being supplemented or replaced by more dynamic, decentralized and distributed energy resources, including solar, wind, natural gas and geothermal power. These advancements have been accompanied by the integration of Internet of Things (IoT) devices and artificial intelligence (AI) systems, which collect and analyze vast amounts of data from various points in the energy production and distribution chain. The integration of these technologies has enabled more efficient energy management, improved forecasting of energy demand and supply, and the ability to optimize power generation in real-time.

However, the increasing complexity of modern energy systems presents significant challenges in terms of economic modeling and optimization. Traditional methods of calculating the Levelized Cost of Energy (LCOE) and predicting profitability often fail to account for the dynamic nature of renewable energy sources and rapidly changing market conditions. The variability of renewable energy production, fluctuating energy prices, and the complexities of compliance and voluntary energy markets make it difficult for energy producers to make informed decisions about production, distribution, and pricing. Additionally, the lack of real-time operational data integration and analysis can lead to suboptimal operational decisions, increased financial risks, and missed opportunities for cost savings or revenue generation. These challenges underscore the need for more sophisticated, real-time economic modeling and optimization tools that can handle the complexities of modern energy systems and provide actionable insights to energy producers.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In one aspect, the present disclosure relates to a system for real-time economic modeling and optimization for integrated power generation and distribution, comprising a data collection module configured to collect real-time multi-frequency data from multiple energy sources and IoT sensors, an integration module configured to integrate the collected data with energy production cost components and market information and weather information from external data sources, an analysis module comprising a physics-based deterministic model and a machine learning model, configured to analyze the integrated data, calculate real-time Levelized Cost of Energy (LCOE) based on current operational expenditure (OPEX) and market conditions, predict profitability, and assess risk, and a recommendation module configured to generate operational adjustment recommendations for the energy production based on at least one of the LCOE and predicted profitability.

In embodiments of this aspect, the disclosure according to any one of the above example embodiments, the data collection module is configured to collect data from renewable energy sources comprising at least one of natural gas, solar, and geothermal power generation.

In embodiments of this aspect, the disclosure according to any one of the above example embodiments, the integration module is configured to integrate data related to capital expenditure (CAPEX), operations and maintenance (O&M) costs, insurance costs, and land lease costs.

In embodiments of this aspect, the disclosure according to any one of the above example embodiments, the analysis module is configured to apply energy production principles in the physics-based model and utilize classification, pattern recognition, and prediction techniques in the machine learning model.

In embodiments of this aspect, the disclosure according to any one of the above example embodiments, the calculation module is configured to dynamically update the LCOE calculation based on real-time changes in operational conditions and measured production performance and market prices.

In embodiments of this aspect, the disclosure according to any one of the above example embodiments, the prediction module is configured to generate profitability forecasts including the dynamic impact over time from both compliance and voluntary financial markets.

In embodiments of this aspect, the disclosure according to any one of the above example embodiments, the recommendation module is configured to provide real-time operational adjustments to optimize the energy production and distribution based on year-to-date market conditions.

In embodiments of this aspect, the disclosure according to any one of the above example embodiments, further comprising a risk assessment module configured to evaluate operational risk for insurance premium calculations.

In embodiments of this aspect, the disclosure according to any one of the above example embodiments, the risk assessment module is further configured to monitor operational risks and develop strategies based on real-time operational performance and environmental direct measurements data.

In embodiments of this aspect, the disclosure according to any one of the above example embodiments, further comprising a blockchain module configured to record a history of the LCOE and the predicted profitability relative to the integrated data and enable smart contracts that automatically update based on new LCOE calculations and risk assessments.

In one aspect, the present disclosure relates to a method for real-time economic modeling and optimization for integrated power generation and distribution, comprising collecting real-time multi-frequency data from multiple energy sources and IoT sensors, integrating the collected data with energy production cost components and market information and weather information from external data sources, analyzing the integrated data using a physics-based model and a machine learning model, calculating real-time Levelized Cost of Energy (LCOE) based on current operational expenditure (OPEX) and market conditions, predicting profitability and accessing risk, generating operational adjustment recommendations for the energy production based on at least one of the LCOE and predicted profitability.

In embodiments of this aspect, the disclosure according to any one of the above example embodiments, collecting data comprises collecting the data from renewable energy sources comprising at least one of solar, natural gas, and geothermal power generation.

In embodiments of this aspect, the disclosure according to any one of the above example embodiments, integrating data comprises integrating the data related to capital expenditure (CAPEX), operations and maintenance (O&M) costs, insurance costs, and land lease costs.

In embodiments of this aspect, the disclosure according to any one of the above example embodiments, analyzing the integrated data comprises applying energy production principles in the physics-based model and utilizing classification, pattern recognition, and prediction techniques in the machine learning model.

In embodiments of this aspect, the disclosure according to any one of the above example embodiments, further comprising dynamically updating the LCOE calculation based on real-time changes in operational conditions and measured production performance and market prices.

In embodiments of this aspect, the disclosure according to any one of the above example embodiments, further comprising generating profitability forecasts including the dynamic impact over time from both compliance and voluntary financial markets.

In embodiments of this aspect, the disclosure according to any one of the above example embodiments, generating the operational adjustment recommendations comprises providing real-time operational adjustments to optimize the energy production and distribution based on year-to-date market conditions.

In embodiments of this aspect, the disclosure according to any one of the above example embodiments, further comprising evaluating operational risk for insurance premium calculations.

In embodiments of this aspect, the disclosure according to any one of the above example embodiments, further comprising monitoring operational risks and developing strategies based on real-time operational performance and environmental direct measurements data.

In embodiments of this aspect, the disclosure according to any one of the above example embodiments, further comprising recording a history of the LCOE and the predicted profitability relative to the integrated data using a blockchain, and enabling smart contracts that automatically update based on new LCOE calculations and risk assessments using the blockchain.

The foregoing general description of the illustrative embodiments and the following detailed description thereof are merely exemplary aspects of the teachings of this disclosure and are not restrictive.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1:
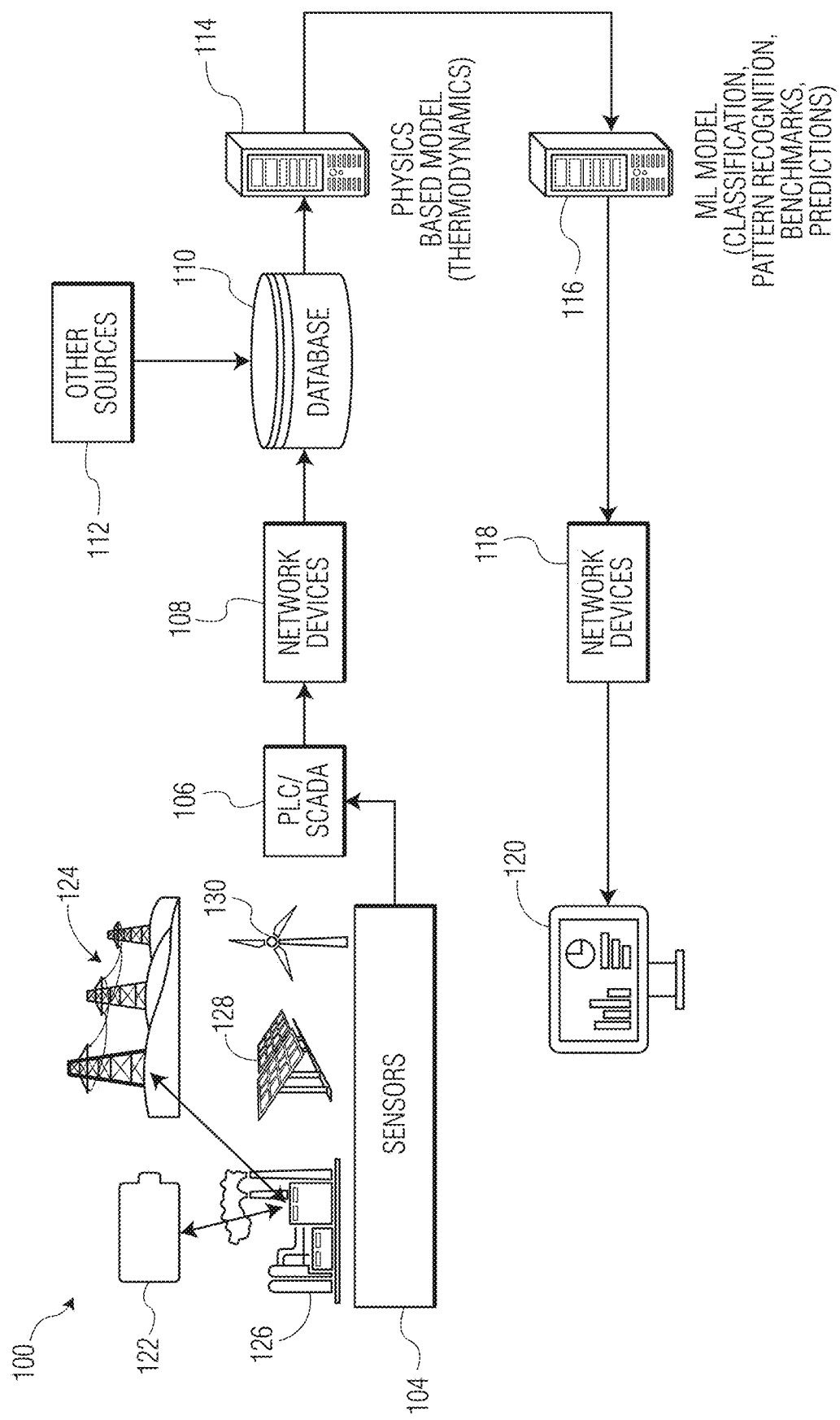
FIG. 1 illustrates a block diagram of a system for real-time economic modeling and optimization of energy production, according to aspects of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

The present disclosure relates to systems and methods for real-time economic modeling and optimization of integrated power generation and distribution. In various aspects, a comprehensive system may be provided for collecting, analyzing, and utilizing data from multiple energy sources and Internet of Things (IoT) sensors to improve energy production efficiency and profitability. The system may include several interconnected modules such as a data collection module, integration module, analysis module, recommendation module and other specialized modules that work in concert to provide dynamic insights and recommendations for energy production operations. An overview of these modules is described below.

In some embodiments, the system may include a data collection module configured to gather real-time multi-frequency data from various energy sources, which may include renewable sources such as solar, wind, or geothermal, as well as conventional sources like natural gas. This data collection module may interface with numerous IoT sensors distributed throughout the power generation and distribution infrastructure to capture a wide range of operational metrics.

The system may further include an integration module that combines the collected operational data with additional information relevant to energy production costs, market conditions, and weather forecasts. This integrated dataset may provide a comprehensive view of the factors influencing energy production and distribution.

An analysis module may be incorporated into the system, utilizing both physics-based models and machine learning (ML) algorithms to process the integrated data. This module may perform various functions, including the calculation of real-time Levelized Cost of Energy (LCOE) based on current operational expenditures (OPEX) and prevailing market conditions. Additionally, the analysis module may generate profitability predictions and conduct risk assessments.

Based on the outputs from the analysis module, a recommendation module may generate operational adjustment suggestions aimed at optimizing energy production and distribution. These recommendations may be tailored to current market conditions and operational parameters, providing actionable insights for energy producers.

In some implementations, the system may also include specialized modules for risk assessment and blockchain integration. The risk assessment module may evaluate operational risks and develop mitigation strategies based on real-time performance data and environmental measurements. The blockchain module may provide a secure and transparent method for recording LCOE calculations, profitability predictions, and other data, while also enabling the use of smart contracts that automatically update based on new calculations and assessments.

In a specific use case, the system may be implemented in a large-scale solar farm operation. The data collection module may gather real-time data from numerous solar panels, inverters, and weather stations distributed across the farm. This data may include solar irradiance levels, panel temperatures, energy output, and local weather conditions.

The integration module may combine this operational data with external information such as electricity market prices, energy demand, weather forecasts, and maintenance schedules. The analysis module may then process this integrated dataset using physics-based models to simulate solar panel performance under various conditions, while ML algorithms may identify patterns in energy production and predict future output based on historical data and weather forecasts.

Based on this analysis, the system may calculate a real-time LCOE that reflects current operational conditions and market prices. The prediction module may generate profitability forecasts that account for both the compliance market (e.g., renewable energy credits) and voluntary markets (e.g., corporate power purchase agreements). These forecasts may help the solar farm operator make informed decisions about energy production and sales strategies.

The recommendation module may provide real-time operational adjustments to optimize energy production and distribution. For instance, it may suggest adjusting the angle of solar panels to increase (e.g., maximize) energy capture based on current and forecasted weather conditions, or recommend shifting maintenance activities to periods of lower expected energy production. These recommendations may help the solar farm operator increase (e.g., maximize) profitability while reducing (e.g., minimizing) operational risks.

Investors and insurance companies may also leverage the system's analysis to make more informed decisions and manage risks effectively. Investors may utilize the real-time LCOE calculations, profitability forecasts, and operational performance data to assess the financial viability and potential returns of the solar farm project. They may also use the system's blockchain-recorded history of LCOE and profitability predictions to track the project's performance over time and verify its financial health. Insurance companies may use the risk assessment module's evaluations and real-time operational risk monitoring to more accurately price insurance premiums and develop tailored coverage plans. The system's ability to provide up-to-date risk profiles based on real-time data and environmental measurements may allow insurers to offer more competitive rates and adjust coverage dynamically as operational conditions change.

The details of the system will now be described in reference to the figures.

Referring to FIG. 1, a block diagram of a system 100 for real-time economic modeling and optimization of energy production is illustrated. The system 100 may include various components that work together to collect, analyze, and optimize data related to energy production and distribution. For example, system 100 may include sensors 104, programmable logic controller and supervisory control and data acquisition (PLC/SCADA) 106, network devices 108, database 110, other sources 112, physics-based model 114, ML model 116, network devices 118, display 120, battery 122, power grid 124, power plant 126, solar panel 128, and wind turbine 130.

In some aspects, the system 100 may include sensors 104 that may be configured to collect real-time multi-frequency data from multiple energy sources. These energy sources may include, but are not limited to, a power plant 126, solar panel 128, and wind turbine 130. The sensors 104 may be IoT devices capable of capturing a wide range of operational metrics. In some cases, the sensors 104 may also collect data from other renewable energy sources such as geothermal power generation. In some aspects, the sensors 104 may include temperature sensors, pressure sensors, flow meters, voltage sensors, and current sensors. Additionally, the system may utilize environmental sensors such as pyranometers for measuring solar irradiance, anemometers for wind speed, and seismometers for geothermal activity monitoring to name a few.

The system 100 may include PLC/SCADA 106 component that may process and control the data collected by the sensors 104. The PLC/SCADA 106 may be connected to network devices 108, which may facilitate data transmission throughout the system. In some implementations, the PLC/SCADA 106 may serve as a central control system for the energy production and distribution processes. The PLC component may handle real-time control and automation tasks, while the SCADA component may provide a human-machine interface for monitoring and supervisory control. This integrated system may allow for efficient data processing, visualization, and remote control of various energy production components across multiple sites.

In some implementations, the system 100 may incorporate a database 110 that may store the collected data. The database 110 may also receive input from other sources 112, which may provide additional data relevant to energy production and market conditions. In some aspects, the database 110 may serve as a central repository for integrating data from various sources, including real-time sensor data, historical performance records, and external market information. The other sources 112 may include, but are not limited to, weather forecasting services, energy market pricing databases, and regulatory compliance databases. By combining data from multiple sources, the system 100 may be able to provide a more comprehensive and accurate analysis of energy production economics.

The system 100 may include an analysis module comprising two key components: a physics-based model 114 and ML model 116. The physics-based model 114 may apply various energy production principles to analyze the integrated data. In some aspects, these principles may include thermodynamics for heat transfer and energy conversion efficiency, fluid dynamics for analyzing flow in turbines or solar thermal systems, and electrical engineering concepts relevant to power generation and transmission. The physics-based model 114 may use these principles to simulate and predict energy production processes, efficiency, and potential issues based on the real-time data collected from the sensors 104. The ML model 116 may utilize a range of techniques to analyze the data and generate insights. In some cases, the ML model 116 may employ classification algorithms to categorize operational states or identify potential anomalies in the energy production system. Pattern recognition techniques may be used to detect trends or recurring issues in the data, such as cyclical patterns in energy demand or production. The ML model 116 may also use predictive analytics to forecast future energy production, demand, and potential maintenance needs, allowing for proactive decision-making and optimization.

In some implementations, the physics-based model 114 may incorporate mass balance principles on the conservation of mass, combined with the first law of thermodynamics for conservation of energy. These fundamental principles may be applied to analyze energy flows and conversions within the system. The machine learning model 116 may utilize time-series analysis techniques such as ARIMA (Autoregressive Integrated Moving Average) for forecasting based on historical power generation and demand data. In some cases, the system may also employ SARIMA (Seasonal ARIMA) models, which account for seasonality in energy production and consumption patterns. These models may be used to predict future energy output, demand fluctuations, and potential system performance, allowing for more accurate optimization and decision-making in energy production operations.

In some implementations, the analysis module may combine the outputs of the physics-based model 114 and the ML model 116 to provide a comprehensive analysis of the energy production system. This combined approach may allow for more accurate predictions and recommendations by leveraging both theoretical principles and data-driven insights. For example, the physics-based model may provide a baseline prediction of energy production based on known physical laws, while the ML model may refine this prediction by accounting for historical patterns and current operational conditions.

In some implementations, the analysis module may be configured to calculate real-time LCOE based on current operational expenditure (OPEX) and market conditions. This calculation may incorporate various factors such as fuel costs, maintenance expenses, and capital costs, as well as the current market price of energy. The LCOE calculation may be dynamically updated based on real-time changes in operational conditions, measured production performance, and fluctuations in market prices, providing an up-to-date view of energy production costs.

The system 100 may also include a recommendation module, which may be implemented as part of the ML model 116 or as a separate component. This module may be configured to generate operational adjustment recommendations for energy production based on the calculated LCOE and predicted profitability. In some cases, these recommendations may include suggestions for adjusting power output, scheduling maintenance activities, or modifying energy storage strategies to optimize energy production and distribution based on current market conditions.

The output from the analysis and recommendation modules may be transmitted through network devices 118 to a display 120. The display 120 may present the processed information, including visualizations and analytics, to system operators for decision-making purposes. This may allow operators to quickly assess the performance and prospects of the energy production system and make informed decisions about production, distribution, and pricing strategies.

The recommendations generated by the system may be displayed to the user, who in some cases may be a technician responsible for managing the energy production system. The user interface may present these recommendations in a clear and actionable format (e.g., via display 120), potentially including visualizations or prioritized lists of suggested adjustments. In some implementations, the technician may review these recommendations and manually implement the suggested changes. For example, the technician may interact with user interface on display 120 (or a user interface on another control platform) that sends control signals to PLC/SCADA 106 to adjust operational parameters for energy generation and storage. For example, the signals may adjust the angle of solar panels, modify maintenance schedules, or alter energy storage strategies based on the system's recommendations.

In other implementations, the system may be configured to automatically implement some or all of the recommended changes via the PLC/SCADA 106 without direct human intervention. This automated approach may allow for more rapid response to changing conditions and potentially increase the efficiency of the energy production system. In some cases, the system may be set up to automatically implement certain types of low-risk adjustments, while requiring human approval for more significant changes. The level of automation may be customizable, allowing operators to define which types of changes can be made automatically and which require human oversight. This flexible approach may help balance the benefits of rapid, data-driven optimization with the need for human expertise and oversight in managing complex energy production systems.

In some implementations, the system 100 may be connected to a power grid 124, allowing for the integration and optimization of energy distribution across multiple sources and consumers. The system 100 may include energy storage (e.g. battery bank) 122 for energy storage purposes. In some aspects, the energy storage 122 may be used to store excess energy produced during periods of low demand or high production, and discharge this energy during peak demand periods or when production is low. The analysis module may take into account the presence of the energy storage 122 when optimizing energy production and distribution. For example, the ML model 116 may predict optimal times for charging and discharging the energy storage 122 based on energy demand forecasts, production capacity, and market price fluctuations.

The integration of the energy storage 122 into the system 100 may allow for more flexible energy management strategies. In some cases, the recommendation module may suggest storing energy in the energy storage 122 during periods of low energy prices and discharging it during peak demand periods to increase (e.g., maximize) profitability. The physics-based model 114 may also consider the efficiency and capacity of the energy storage 122 when calculating overall system performance and LCOE. This may include factors such as charge/discharge efficiency, battery degradation over time, and the impact of different usage patterns on battery lifespan.

Figure 2:
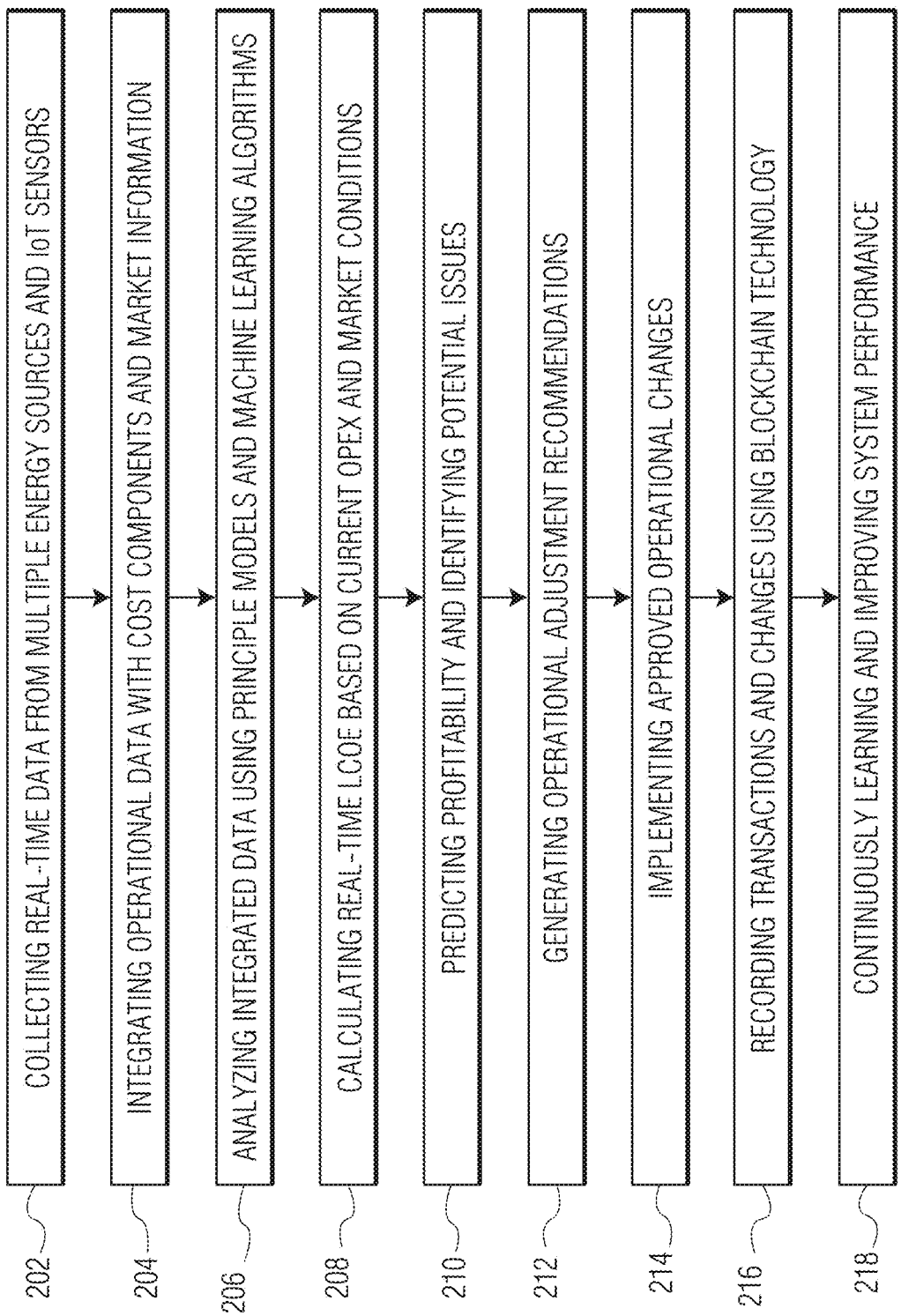
FIG. 2 illustrates an overall flowchart of a method for real-time economic modeling and optimization of energy production, according to aspects of the present disclosure.

Referring to FIG. 2, a flowchart illustrating a method 200 for real-time economic modeling and optimization of energy production is shown. The method 200 may include several steps that work together to provide comprehensive analysis and recommendations for energy production systems. The method 200 may include steps 202 (collecting real-time data), 204 (integrating operational data), 206 (analyzing integrated data), 208 (calculating real-time LCOE), 210 (predicting profitability and identifying issues), 212 (generating operational adjustment recommendations), 214 (implementing approved changes), 216 (recording transactions using blockchain), and 218 (continuous learning and improvement).

In step 202, the method 200 may involve collecting real-time multi-frequency data from multiple energy sources and IoT sensors. This data collection may encompass a wide range of information from various sources. For example, in some cases, the data may be collected from renewable energy sources such as solar panels, wind turbines, or geothermal power plants. In other instances, data may be gathered from conventional power sources like natural gas plants. The IoT sensors may capture a variety of operational metrics, including but not limited to energy output, equipment performance, and environmental conditions.

The data collection process in step 202 may utilize a network of strategically placed sensors throughout the energy production and distribution infrastructure. These sensors may include temperature sensors, pressure sensors, flow meters, voltage sensors, and current sensors. In some implementations, environmental sensors such as pyranometers for measuring solar irradiance, anemometers for wind speed, and seismometers for geothermal activity monitoring may also be employed. The real-time nature of this data collection may allow for immediate analysis and response to changing conditions in the energy production system.

Step 204 of the method 200 may involve integrating the collected data with energy production cost components and market information. In some aspects, this integration may include incorporating data related to capital expenditure (CAPEX), operations and maintenance (O&M) costs, insurance costs, and land lease costs. The integration module may also incorporate market information such as current energy prices, demand forecasts, and regulatory requirements. Additionally, weather information from external data sources may be integrated, as weather conditions can significantly impact energy production, especially for renewable sources.

In some implementations, the integration process in step 204 may involve combining data from various sources into a unified dataset. This may include merging real-time operational data from sensors with historical cost data, market pricing information, and weather forecasts. The integrated dataset may provide a comprehensive view of the factors influencing energy production economics. For example, the system may combine current solar panel output data with weather forecasts to predict future energy production, while also factoring in maintenance schedules and projected market prices. This holistic approach to data integration may enable more accurate LCOE calculations and profitability predictions in subsequent steps of the method 200.

In step 206, the method 200 may analyze the integrated data using principle models and ML algorithms. This analysis may involve applying energy production principles in a physics-based model to simulate and predict system behavior. Concurrently, ML algorithms may be employed to identify patterns, classify operational states, and generate predictions based on historical and real-time data.

In some implementations, the physics-based model may incorporate principles from thermodynamics, fluid dynamics, and electrical engineering to model energy production processes. For example, it may simulate heat transfer in solar panels, airflow patterns for wind turbines, or steam cycles in geothermal plants. The ML algorithms may include techniques such as neural networks, decision trees, or support vector machines to analyze complex relationships in the data. These algorithms may be trained on historical operational data to improve their predictive accuracy over time.

Step 208 may involve calculating real-time LCOE based on current OPEX and market conditions. This calculation may be dynamically updated as new data becomes available, providing an up-to-date view of the energy production costs. The LCOE calculation may take into account various factors such as fuel costs, maintenance expenses, and capital costs, as well as the current market price of energy.

In some implementations, the LCOE calculation in step 208 may incorporate data from multiple sources to provide a comprehensive analysis. For example, it may consider real-time operational data from sensors, historical cost trends, current market prices, and forecasted market conditions. The calculation may also factor in the impact of various incentives and tax credits applicable to the energy production system. By integrating these diverse data points, the LCOE calculation may provide a more accurate representation of the true cost of energy production under current conditions.

In step 210, the method 200 may predict profitability and identify potential issues based on the analyzed data and LCOE calculations. This step may involve forecasting future revenue streams, estimating potential risks, and identifying opportunities for cost reduction or efficiency improvements.

In some implementations, step 210 may utilize advanced predictive analytics techniques to generate detailed profitability forecasts. These forecasts may take into account various factors such as projected energy demand, anticipated market prices, and expected operational costs. The method may also employ scenario analysis to evaluate potential profitability under different market conditions or operational scenarios. Additionally, step 210 may involve a comprehensive risk assessment process. This may include identifying potential operational risks, such as equipment failures or supply chain disruptions, as well as market risks like price volatility or regulatory changes. The method may use statistical models and historical data to quantify these risks and estimate their potential impact on profitability.

Based on these predictions and identified issues, step 212 may generate operational adjustment recommendations. These recommendations may be aimed at optimizing energy production, reducing costs, or maximizing profitability based on the current operational and market conditions.

In some implementations, step 212 may utilize advanced analytics techniques to generate detailed and actionable recommendations. The system may consider multiple factors such as weather forecasts, equipment performance data, market price predictions, and regulatory requirements to provide comprehensive suggestions. For example, the recommendations may include adjusting power output levels, modifying maintenance schedules, or altering energy storage strategies. The system may also prioritize recommendations based on their potential impact on profitability or risk mitigation. Additionally, step 212 may provide scenario analysis, allowing operators to evaluate the potential outcomes of different operational decisions before implementation.

Step 214 may involve implementing the approved operational changes. This step may include adjusting power output, scheduling maintenance activities, or modifying energy storage strategies based on the recommendations generated in the previous step.

In some implementations, step 214 may involve a phased approach to implementing changes. For example, the system may first implement small adjustments to power output or maintenance schedules to assess their impact before making larger changes. The implementation process may also include monitoring key performance indicators in real-time to evaluate the effectiveness of the changes. Additionally, step 214 may involve coordinating with various teams or departments within the energy production facility to ensure smooth implementation of the approved changes. This coordination may include communicating the rationale behind the changes, providing training if beneficial, and establishing feedback mechanisms to capture insights from personnel directly involved in the operations.

In step 216, the method 200 may record transactions and changes using blockchain technology. This may provide a secure and transparent record of all operational decisions and their outcomes, which can be valuable for auditing purposes and for refining future predictions and recommendations. In some implementations, the blockchain recording in step 216 may involve creating immutable blocks of data that contain details of each transaction or operational change. These blocks may be cryptographically linked to form a chain, ensuring the integrity and chronological order of the recorded information. The blockchain may store various types of data, including LCOE calculations, profitability predictions, operational adjustments, and their resulting outcomes. The use of blockchain technology in this step may offer several potential benefits. It may provide a tamper-resistant audit trail that can be used to verify the history of operational decisions and their financial impacts. This transparent record may be particularly useful for regulatory compliance and for building trust with stakeholders. Additionally, the blockchain data may serve as a valuable resource for ML models, potentially improving the accuracy of future predictions and recommendations by providing a rich historical dataset of operational decisions, model taxonomy and their outcomes.

Step 218 may involve continuously learning and improving system performance based on the outcomes of previous steps. This ongoing learning process may allow the system to adapt to changing conditions and improve its predictions and recommendations over time. In some implementations, step 218 may utilize ML techniques to analyze the results of previous operational adjustments and their impacts on system performance. The system may identify patterns and correlations between specific recommendations and their outcomes, allowing it to refine its decision-making processes. Additionally, step 218 may involve periodic retraining of the ML models used in earlier steps, incorporating new data to improve their accuracy and predictive capabilities. This continuous improvement process may enable the system to become more effective at optimizing energy production and profitability over time, adapting to changes in market conditions, operational parameters, and external factors that influence energy production economics.

Continuing with the specific use case of a large-scale solar farm operation, steps 202-218 of method 200 may be applied to optimize energy production and profitability. In step 202, the data collection module may gather real-time data from numerous solar panels, inverters, and weather stations distributed across the farm. This data may include solar irradiance levels, panel temperatures, energy output, and local weather conditions. The integration module in step 204 may combine this operational data with external information such as electricity market prices, energy demand forecasts, and maintenance schedules. In steps 206 and 208, the analysis module may process this integrated dataset using physics-based models to simulate solar panel performance under various conditions, while ML algorithms may identify patterns in energy production and predict future output based on historical data and weather forecasts. Based on this analysis, the system may calculate a real-time LCOE that reflects current operational conditions and market prices.

In steps 210 and 212, the prediction module may generate profitability forecasts that account for both the compliance market (e.g., renewable energy credits) and voluntary markets (e.g., corporate power purchase agreements). The recommendation module may then provide real-time operational adjustments to optimize energy production and distribution. For instance, it may suggest adjusting the angle of solar panels to increase (e.g., maximize) energy capture based on current and forecasted weather conditions, or recommend shifting maintenance activities to periods of lower expected energy production. In steps 214 and 216, these recommendations may be implemented and recorded using blockchain technology, creating a secure and transparent record of all operational decisions and their outcomes. In step 218, the system may continuously learn from the results of these adjustments, refining its predictive models and optimization strategies over time to improve the overall performance and profitability of the solar farm operation.

Figure 3:
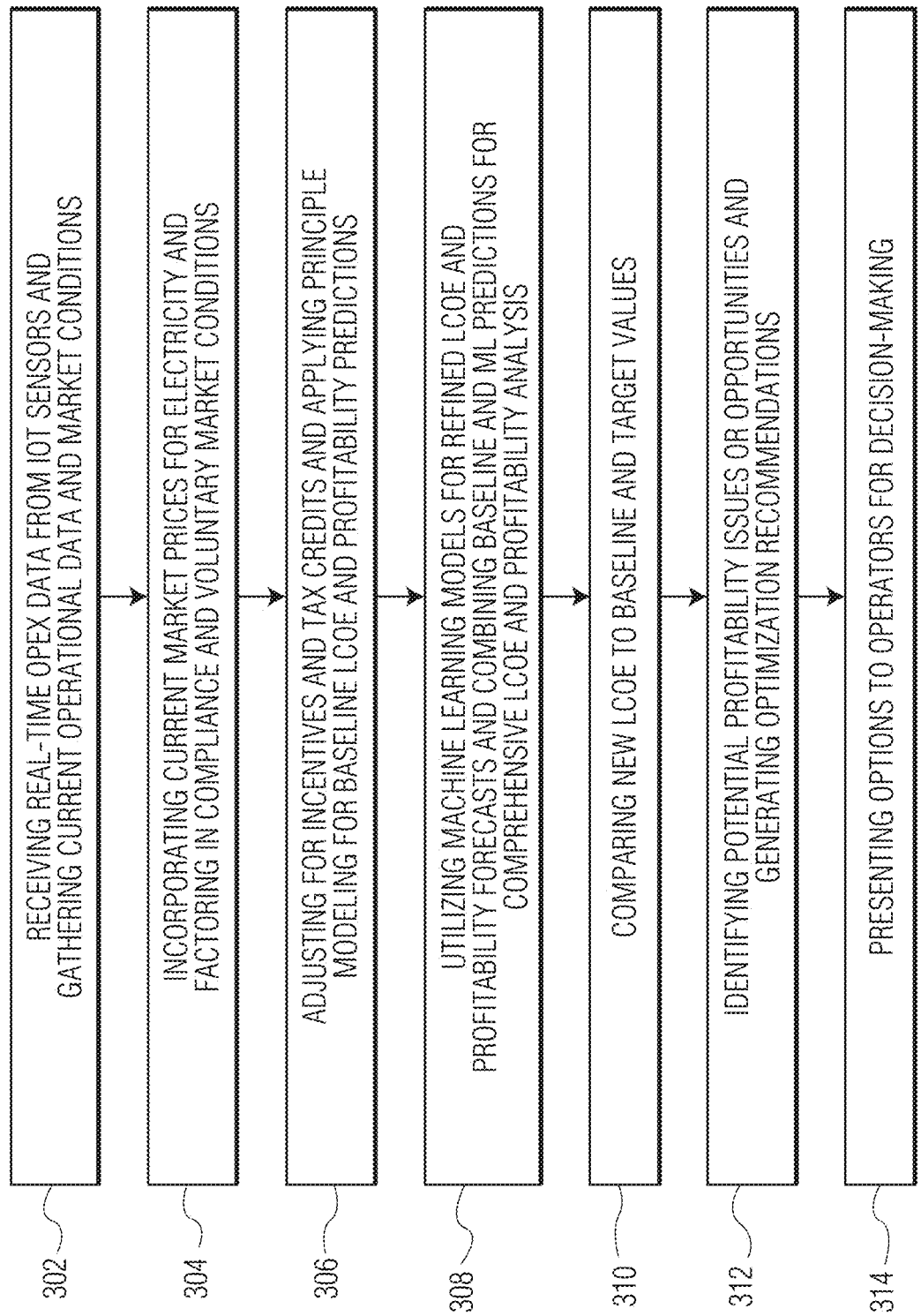
FIG. 3 illustrates a flowchart of another method for real-time economic modeling and optimization of energy production, according to aspects of the present disclosure.

Referring to FIG. 3, a flowchart illustrating a method 300 for dynamic LCOE calculation, profitability forecasting, and optimization recommendation in real-time economic modeling of energy production is shown. The method 300 may include several steps that work together to provide comprehensive analysis and recommendations for energy production systems. The method 300 in FIG. 3 may include steps 302 (receiving real-time OPEX data), 304 (incorporating market prices), 306 (adjusting for incentives and applying principle modeling), 308 (utilizing ML models), 310 (comparing new LCOE), 312 (identifying profitability issues and generating recommendations), and 314 (presenting options to operators).

In step 302, the method 300 may involve receiving real-time OPEX data from IoT sensors and gathering current operational data and market conditions. This step may include collecting data on fuel costs, maintenance expenses, and other operational expenditures, as well as current energy prices and demand levels. Step 302 may also involve analyzing the received data to identify trends and anomalies that may impact energy production efficiency and cost-effectiveness. This analysis may help in forecasting future operational needs and adjusting strategies accordingly. Additionally, the data collected may be used to enhance the accuracy of the ML models employed in later stages of the method, thereby improving the overall predictive performance of the system.

Step 304 may involve incorporating current market prices for electricity and factoring in compliance and voluntary market conditions. In some aspects, this step may include analyzing data from both regulated energy markets and voluntary renewable energy certificate markets. The analysis may consider factors such as current electricity prices, renewable energy credit values, and market trends. In some implementations, the system may utilize ML algorithms to predict future market conditions based on historical data and current trends. This comprehensive market analysis may allow for more accurate LCOE calculations and profitability forecasts, taking into account the potential revenue streams from both compliance and voluntary markets. Additionally, the step may involve assessing the impact of various regulatory policies and incentive programs on market conditions, which may influence the overall economic modeling of the energy production system.

In step 306, the method 300 may adjust for incentives and tax credits and apply principle modeling for baseline LCOE and profitability predictions. This step may take into account various government incentives for renewable energy production and any applicable tax credits. The principle modeling may provide an initial estimate of LCOE and profitability based on established energy production principles. In some implementations, step 306 may involve a detailed analysis of available incentives and tax credits specific to the energy production system. This may include federal, state, and local incentives such as production tax credits, investment tax credits, accelerated depreciation schedules, and renewable energy certificates. The method may calculate the potential financial impact of these incentives on the overall project economics. Additionally, the principle modeling in this step may incorporate factors such as equipment efficiency, expected energy output, and projected operational costs to generate baseline LCOE and profitability estimates. These baseline predictions may serve as a foundation for further refinement in subsequent steps of the method.

Step 308 may involve utilizing ML models for refined LCOE and profitability forecasts, and combining baseline and ML predictions for comprehensive LCOE and profitability analysis. In some cases, the ML models may analyze historical data and current trends to provide more accurate predictions of future LCOE and profitability. In some implementations, step 308 may employ various ML techniques such as neural networks, decision trees, or support vector machines to analyze complex relationships in the data. These models may be trained on historical operational and financial data to improve their predictive accuracy over time. The ML models may consider multiple factors such as weather patterns, equipment performance, market price fluctuations, and regulatory changes to generate refined forecasts.

The combination of baseline predictions from principle-based models and ML predictions in step 308 may provide a more robust and comprehensive analysis. In some aspects, this combined approach may allow for more accurate predictions by leveraging both theoretical principles and data-driven insights. For example, the baseline model may provide initial estimates based on known physical and economic principles, while the ML model may refine these predictions by accounting for complex patterns and relationships identified in historical data. This integrated approach may enable more informed decision-making and strategic planning in the dynamic energy production sector.

In step 310, the method 300 may compare the new LCOE to baseline and target values. This comparison may help identify any significant deviations from expected or desired LCOE levels. In some implementations, the system may analyze historical LCOE data to establish baseline values and set target LCOE levels based on industry benchmarks or organizational goals. The comparison process may involve calculating percentage differences or absolute value changes between the new LCOE and the baseline/target values. Additionally, the system may employ statistical techniques such as standard deviation analysis to determine if the new LCOE falls within an acceptable range of variation. If significant deviations are detected, the system may flag these for further investigation or trigger automatic alerts to relevant stakeholders. This step may play a beneficial role in the ongoing monitoring and optimization of energy production economics, allowing operators to quickly identify and respond to changes in LCOE that may impact overall profitability.

Step 312 may involve identifying potential profitability issues or opportunities and generating optimization recommendations. Based on the comprehensive analysis performed in previous steps, this step may highlight areas where profitability maybe improved or where potential issues may arise. In some implementations, the system may utilize advanced analytics techniques to identify specific factors impacting profitability, such as operational inefficiencies, market price fluctuations, or regulatory changes. The optimization recommendations generated in this step may be tailored to address these identified issues or capitalize on opportunities. For example, the system may suggest adjustments to energy production levels, modifications to maintenance schedules, or changes in energy storage strategies to increase (e.g., maximize) profitability given current market conditions. Additionally, the recommendations may include longer-term strategic suggestions, such as investments in new technologies or exploration of alternative revenue streams, to enhance the overall financial performance of the energy production system.

In step 314, the method 300 may present options to operators for decision-making. These options may include suggested operational adjustments, investment recommendations, or market strategies to optimize energy production and profitability. In some implementations, the options presented in step 314 may be prioritized based on their potential impact on profitability or risk mitigation. The system may provide detailed analyses of each option, including projected financial outcomes and potential risks. For example, the system may suggest adjusting power output levels in response to forecasted market price fluctuations or recommend modifications to maintenance schedules based on equipment performance data and weather forecasts. Additionally, step 314 may include scenario analysis capabilities, allowing operators to compare multiple options and evaluate their potential outcomes before making decisions. This comprehensive approach to decision support may enable operators to make more informed choices in the dynamic energy production environment.

Continuing with the specific use case of a large-scale solar farm operation, steps 302-314 of method 300 may be applied to optimize energy production and profitability. In step 302, the system may receive real-time operational expenditure data from IoT sensors distributed across the solar farm, including information on panel performance, inverter efficiency, and maintenance costs. This data may be combined with current market conditions such as electricity prices and demand levels. Step 304 may involve incorporating the latest market prices for solar energy, considering both the regulated energy markets and voluntary renewable energy certificate markets. The system may analyze trends in solar renewable energy credits and factor in any changes in regulatory policies that may impact the solar farm's revenue streams.

Steps 306 and 308 may involve adjusting for solar-specific incentives such as investment tax credits or production tax credits and applying principle modeling to establish baseline LCOE and profitability predictions for the solar farm. ML models may then refine these forecasts by analyzing historical solar production data, weather patterns, and market trends specific to the solar energy sector. In steps 310-314, the system may compare the new LCOE calculations to industry benchmarks for solar energy production, identify potential profitability issues such as unexpected panel degradation or changes in local energy demand, and generate optimization recommendations. These recommendations may include adjusting panel tilt angles, optimizing cleaning schedules, or suggesting investments in energy storage solutions to capitalize on peak pricing periods. The system may present these options to solar farm operators, prioritizing actions that may have a significant impact on the farm's profitability and long-term sustainability.

Figure 4:
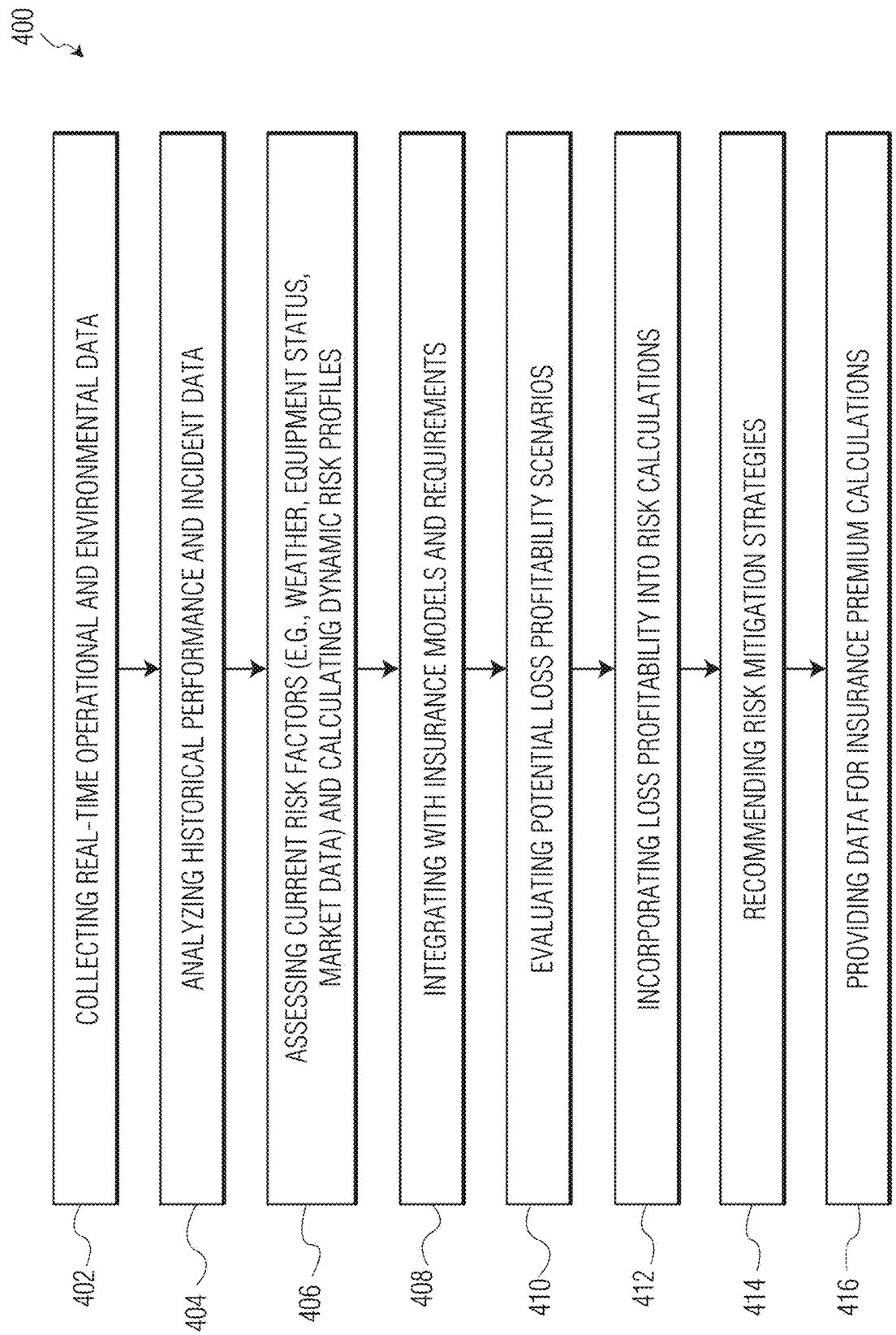
FIG. 4 illustrates a flowchart of a method for risk assessment and insurance integration in energy production systems, according to aspects of the present disclosure.

Referring to FIG. 4, a flowchart illustrating a method 400 for risk assessment and insurance integration in energy production systems is shown. The method 400 may include several steps that work together to provide comprehensive risk analysis and management for energy production operations. The method 400 may include steps 402 (collecting real-time operational and environmental data), 404 (analyzing historical performance and incident data), 406 (assessing current risk factors and calculating dynamic risk profiles), 408 (integrating assessed data with insurance models and requirements), 410 (evaluating potential loss profitability scenarios), 412 (incorporating loss profitability into risk calculations), 414 (recommending risk mitigation strategies), and 416 (providing data for insurance premium calculations).

In step 402, the method 400 may involve collecting real-time operational and environmental data. This data collection may encompass a wide range of information from various sources, including IoT sensors, weather stations, and equipment monitoring systems. The collected data may include metrics such as energy output, equipment performance, weather conditions, and market prices. In some implementations, the data collection process in step 402 may utilize a network of strategically placed sensors throughout the energy production and distribution infrastructure. These sensors may include temperature sensors, pressure sensors, flow meters, voltage sensors, and current sensors. Additionally, environmental sensors such as pyranometers for measuring solar irradiance, anemometers for wind speed, and seismometers for geothermal activity monitoring may be employed. The real-time nature of this data collection may allow for immediate analysis and response to changing conditions in the energy production system.

Step 404 of the method 400 may involve analyzing historical performance and incident data. This analysis may help identify patterns, trends, and potential risk factors based on past events and operational history. In some aspects, ML algorithms may be employed to detect subtle correlations and predict potential future incidents. In some implementations, step 404 may include a comprehensive review of historical operational data, maintenance records, and incident reports. This may involve analyzing factors such as equipment failure rates, downtime durations, and the circumstances surrounding past incidents. The system may utilize data mining techniques to extract valuable insights from large datasets, potentially uncovering hidden patterns or relationships that may not be immediately apparent.

Additionally, the analysis in step 404 may incorporate external data sources, such as weather patterns or market conditions, to provide context for historical performance and incidents. By correlating internal operational data with external factors, the system may develop a more nuanced understanding of risk factors and their potential impacts. This holistic approach to historical data analysis may enhance the system's ability to assess current risks and predict future challenges in energy production operations.

In step 406, the method 400 may assess current risk factors and calculate dynamic risk profiles. This assessment may take into account various factors such as weather conditions, equipment status, and market data. The dynamic risk profiles may be continuously updated as new data becomes available, providing an up-to-date view of the operational risks. In some implementations, step 406 may involve a detailed analysis of real-time sensor data to identify potential risk factors. For example, the system may analyze weather forecasts to assess the likelihood of extreme weather events that may impact energy production. Equipment status data may be evaluated to identify potential maintenance issues or failure risks. Market data analysis may help identify financial risks associated with price fluctuations or changes in demand.

The calculation of dynamic risk profiles in step 406 may utilize advanced statistical techniques and ML algorithms. These algorithms may process historical data alongside real-time inputs to generate risk scores for various operational aspects. In some cases, the system may employ Monte Carlo simulations to model potential risk scenarios and their probabilities. The continuous updating of risk profiles may allow for real-time risk management and decision-making. As new data becomes available, the system may automatically recalculate risk scores and update the risk profiles. This dynamic approach may enable operators to respond quickly to changing conditions and implement timely risk mitigation strategies.

Step 408 may involve integrating the assessed data with insurance models and requirements. This integration may allow for more accurate insurance premium calculations based on real-time operational risk assessments. In some cases, this step may also involve adjusting insurance coverage based on the current risk profile. In some implementations, step 408 may utilize advanced data analytics techniques to combine the assessed operational risk data with insurance industry models and regulatory requirements. This integrated approach may enable a more dynamic and responsive insurance strategy that adapts to changing conditions in real-time. For example, the system may continuously update risk profiles based on current operational data, weather conditions, and market factors, allowing insurance providers to offer more tailored and cost-effective coverage options. Additionally, this step may involve analyzing historical claims data alongside current risk assessments to identify trends and potential areas for risk mitigation, potentially leading to reduced premiums and improved operational safety.

In step 410, the method 400 may evaluate potential loss profitability scenarios. This evaluation may consider various risk factors and their potential impact on profitability. The system may simulate different scenarios to estimate potential financial losses under various conditions. In some implementations, step 410 may involve using advanced modeling techniques to analyze how different risk factors may affect profitability. This may include examining scenarios such as equipment failures, market price fluctuations, or regulatory changes. The system may utilize historical data and current market trends to generate probabilistic models of potential losses. Additionally, step 410 may incorporate sensitivity analysis to determine which risk factors have a significant impact on profitability. This comprehensive approach to scenario evaluation may provide valuable insights for risk management and strategic planning in energy production operations.

Step 412 may involve incorporating loss profitability into risk calculations. This step may refine the risk assessment by considering not only the likelihood of incidents but also their potential financial impact. In some aspects, this may lead to a more comprehensive understanding of operational risks and their economic implications. In some implementations, step 412 may utilize advanced financial modeling techniques to quantify the potential losses associated with different risk scenarios. This may involve analyzing historical data on incidents and their financial consequences, as well as projecting future scenarios based on current operational conditions and market trends. The incorporation of loss profitability into risk calculations may allow for a more nuanced approach to risk management, potentially enabling more informed decision-making regarding insurance coverage, operational strategies, and capital investments.

Additionally, step 412 may involve the development of risk-adjusted profitability metrics. These metrics may combine traditional financial performance indicators with risk factors to provide a more holistic view of the energy production system's economic health. By considering both the upside potential and downside risks, these metrics may offer valuable insights for stakeholders, potentially aiding in strategic planning and performance evaluation.

In step 414, the method 400 may recommend risk mitigation strategies based on the analyzed data and calculated risks. These recommendations may include suggestions for equipment maintenance, operational adjustments, or insurance coverage modifications to reduce (e.g., minimize) potential losses and optimize profitability.

In some implementations, the risk mitigation strategies recommended in step 414 may be tailored to address specific risk factors identified in earlier steps of the method. For example, if weather-related risks are found to be significant, the system may suggest implementing more robust weather monitoring systems or adjusting operational procedures during extreme weather events. If equipment failure risks are high, recommendations may include implementing predictive maintenance schedules or investing in more reliable equipment. The system may also provide cost-benefit analyses for different risk mitigation strategies, allowing operators to make informed decisions about which strategies to implement. Additionally, step 414 may involve prioritizing risk mitigation strategies based on their potential impact on overall profitability and operational stability, ensuring that effective strategies are highlighted for immediate consideration.

Step 416 may involve providing data for insurance premium calculations. This step may utilize the comprehensive risk assessment and profitability analysis performed in the previous steps to inform insurance pricing. In some cases, this may lead to more accurate and fair insurance premiums that reflect the actual operational risks of the energy production system.

In some implementations, step 416 may involve a detailed analysis of the risk factors identified in earlier steps, such as equipment reliability, weather patterns, and market conditions. The system may generate risk profiles that quantify the likelihood and potential impact of various operational risks. These risk profiles may be used by insurance providers to tailor coverage options and determine appropriate premium levels.

Additionally, the data provided in step 416 may include historical performance data, incident reports, and the effectiveness of implemented risk mitigation strategies. This comprehensive dataset may allow insurance providers to make more informed decisions about coverage and pricing. In some cases, energy producers who demonstrate effective risk management practices through this data may be eligible for more favorable insurance terms.

In the specific use case of a large-scale solar farm operation, steps 402-416 of method 400 may be applied to optimize risk assessment and insurance integration. In step 402, the system may collect real-time operational data from various sensors distributed across the solar farm, including solar panel output, inverter efficiency, and weather conditions. This data may be combined with historical performance records and incident reports from previous years of operation. Step 404 may involve analyzing this historical data to identify patterns in equipment degradation, weather-related disruptions, and maintenance issues specific to solar farm operations. The system may use ML algorithms to detect correlations between factors such as panel age, weather patterns, and performance degradation, potentially uncovering hidden relationships that may impact future risk assessments.

Steps 406-412 may focus on assessing current risk factors and calculating dynamic risk profiles specific to solar energy production. For example, the system may analyze weather forecasts to assess the likelihood of hail storms or extreme heat events that may damage solar panels or reduce their efficiency. Equipment status data may be evaluated to identify potential inverter failures or wiring issues that may lead to production losses. The system may then integrate this assessed data with insurance models tailored for renewable energy projects in step 408. In steps 410-412, the method may evaluate potential loss scenarios such as extended periods of low solar irradiance or unexpected equipment failures, and incorporate these into risk-adjusted profitability calculations. Steps 414-416 may involve recommending risk mitigation strategies specific to solar farm operations, such as implementing advanced panel cleaning systems to mitigate dust-related efficiency losses, or suggesting maintenance schedules based on predicted equipment wear. The system may provide detailed risk profiles and performance data to insurance providers, potentially leading to more accurate and favorable premium calculations for the solar farm operation.

Figure 5:
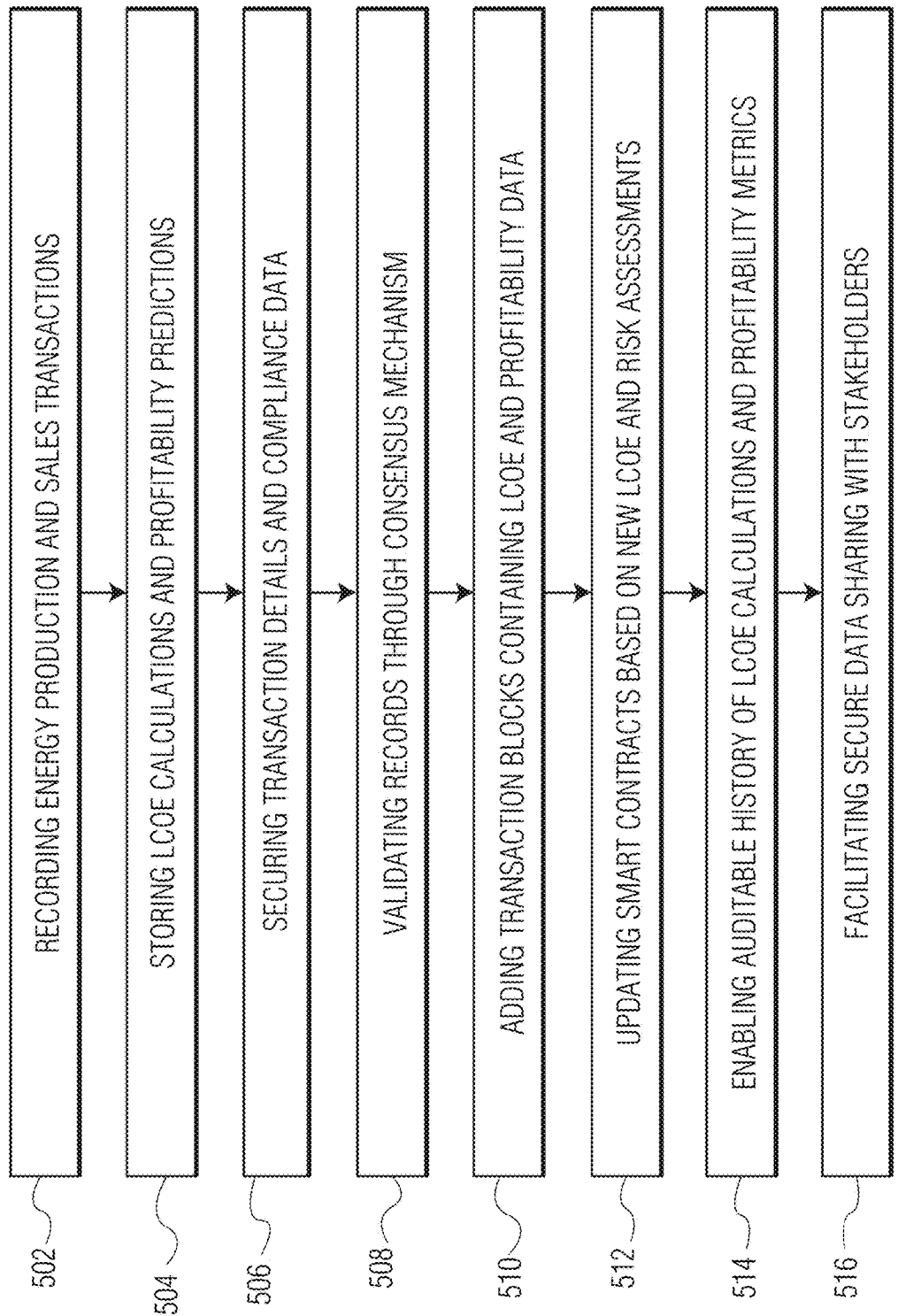
FIG. 5 illustrates a flowchart of a method for blockchain integration with LCOE and profitability analysis in energy production systems, according to aspects of the present disclosure.

Referring to FIG. 5, a flowchart illustrating a method 500 for blockchain integration with LCOE and profitability analysis in energy production systems is shown. The method 500 may include several steps that work together to provide a secure and transparent record of financial and operational data for energy production systems. The method 500 may include steps 502 (recording energy production and sales transactions), 504 (storing LCOE calculations and profitability predictions), 506 (securing transaction details and compliance data), 508 (validating records through a consensus mechanism), 510 (adding transaction blocks containing LCOE and profitability data to the blockchain), 512 (updating smart contracts based on new LCOE calculations and risk assessments), 514 (enabling an auditable history of LCOE calculations and profitability metrics), and 516 (facilitating secure data sharing with stakeholders).

In step 502, the method 500 may involve recording energy production and sales transactions. This step may capture detailed information about energy generation, distribution, and sales activities. In some aspects, the recorded data may include the amount of energy produced, the time of production, the source of energy (e.g., solar, wind, or geothermal), and the sale price.

In some implementations, step 502 may also involve recording additional contextual information related to the energy production and sales transactions. This may include environmental data such as weather conditions at the time of production, operational data like equipment performance metrics, and market data such as current energy demand and pricing trends. The system may utilize IoT sensors and smart meters to collect real-time data on energy production and consumption. Additionally, step 502 may incorporate blockchain technology to ensure the security and immutability of the recorded transactions, potentially enhancing transparency and trust in the energy trading process.

Step 504 may involve storing LCOE calculations and profitability predictions. The blockchain may record the real-time LCOE calculations based on current operational expenditure (OPEX) and market conditions, as well as the profitability forecasts generated by the system's analysis module. This may create a historical record of how these key financial metrics change over time.

In some implementations, step 504 may also include storing additional contextual information alongside the LCOE calculations and profitability predictions. This contextual data may include factors such as weather conditions, equipment performance metrics, and relevant market indicators at the time of each calculation. By storing this comprehensive dataset, the blockchain may provide a rich historical context for analyzing trends and patterns in LCOE and profitability over extended periods. This detailed record may be valuable for various stakeholders, including energy producers, investors, and regulators, as it may offer insights into the factors influencing energy production economics and help inform future decision-making and strategy development.

In step 506, the method 500 may secure transaction details and compliance data. This step may involve encrypting sensitive information and ensuring that only authorized parties have access to specific data points. In some cases, this may include recording data related to regulatory compliance, such as emissions data or renewable energy credits.

In some implementations, step 506 may also involve implementing advanced data protection measures to safeguard the integrity and confidentiality of the recorded information. This may include utilizing cryptographic techniques such as digital signatures and hash functions to verify the authenticity and immutability of the transaction details. Additionally, the system may employ access control mechanisms to manage and monitor user permissions, ensuring that sensitive data is only accessible to authorized personnel. The compliance data secured in this step may encompass a wide range of information, potentially including environmental impact assessments, safety records, and documentation of adherence to industry standards. By securing this data within the blockchain framework, the method 500 may provide a tamper-resistant and transparent record of compliance, which may be valuable for auditing purposes and demonstrating regulatory adherence to relevant authorities.

Step 508 may involve validating records through a consensus mechanism. This step may ensure the integrity and accuracy of the recorded data by requiring multiple nodes in the blockchain network to verify and agree on the information before it is added to the blockchain. In some implementations, the consensus mechanism in step 508 may utilize various algorithms such as Proof of Work, Proof of Stake, or Practical Byzantine Fault Tolerance. The choice of consensus algorithm may depend on factors like the size of the network, desired transaction speed, and energy efficiency requirements. During the validation process, participating nodes may check the validity of new transactions against the existing blockchain history and network rules. This distributed verification approach may help prevent fraudulent entries and maintain the overall reliability of the blockchain ledger. Additionally, the consensus mechanism may play a role in resolving any conflicts or discrepancies that arise during the validation process, ensuring that all nodes in the network eventually agree on the state of the blockchain.

In step 510, the method 500 may add transaction blocks containing LCOE and profitability data to the blockchain. Each block may contain a set of transactions and associated financial data, creating an immutable record of the energy production system's financial performance over time. In some implementations, the transaction blocks added in step 510 may include detailed metadata about each transaction, such as timestamp, energy source, production volume, and market conditions at the time of the transaction. This comprehensive data capture may allow for more granular analysis of financial performance trends. Additionally, the blockchain structure may enable the creation of smart contracts that can automatically execute based on predefined conditions related to LCOE or profitability metrics. For example, a smart contract may trigger alerts or actions if the LCOE exceeds a certain threshold, potentially prompting operational adjustments to optimize costs.

Step 512 may involve updating smart contracts based on new LCOE calculations and risk assessments. In some aspects, these smart contracts may automatically trigger actions or payments based on predefined conditions. For example, a smart contract may automatically adjust energy pricing based on real-time LCOE calculations. In some implementations, step 512 may also include the creation of new smart contracts or the modification of existing ones to reflect changing market conditions or operational parameters. These smart contracts may be designed to optimize various aspects of energy production and distribution, such as automatically scheduling maintenance activities during periods of low energy demand or adjusting energy storage strategies based on predicted market prices. The system may utilize ML algorithms to continuously refine the parameters and conditions of these smart contracts, potentially improving their effectiveness over time. Additionally, the blockchain integration may allow for transparent and secure execution of these smart contracts, providing stakeholders with real-time visibility into contract performance and automated transactions.

In step 514, the method 500 may enable an auditable history of LCOE calculations and profitability metrics. This step may allow authorized parties to review the historical performance of the energy production system, providing transparency and accountability. In some implementations, step 514 may involve creating a detailed chronological record of all LCOE calculations and profitability metrics generated by the system. This historical data may be stored securely on the blockchain, ensuring its integrity and immutability. The auditable history may include timestamps, input parameters, and the resulting calculations, allowing for comprehensive analysis of how LCOE and profitability have changed over time. Additionally, this step may incorporate features that enable authorized users to easily query and visualize the historical data, potentially through interactive dashboards or customizable reports. The ability to access and analyze this historical information may support long-term strategic planning and help identify trends or patterns in the energy production system's economic performance.

Step 516 may facilitate secure data sharing with stakeholders. This step may allow various parties, such as investors, regulators, or partners, to access relevant data while maintaining the security and integrity of the information. In some implementations, step 516 may involve the use of advanced encryption techniques and access control mechanisms to ensure that sensitive data is protected while still allowing authorized stakeholders to view and analyze beneficial information. The system may provide different levels of access based on the stakeholder's role and permissions. For example, investors may be granted access to financial performance data and profitability forecasts, while regulators may be given access to compliance-related information. Additionally, this step may include features for real-time data sharing, allowing stakeholders to view up-to-date information on energy production, costs, and market conditions. The secure data sharing facilitated in step 516 may enhance transparency and collaboration among various parties involved in the energy production system, potentially leading to more informed decision-making and improved overall performance.

Continuing with the specific use case of a large-scale solar farm operation, steps 502-516 of method 500 may be applied to optimize blockchain integration with LCOE and profitability analysis. In step 502, the system may record detailed information about solar energy production, including the amount of electricity generated by each panel or array, the time of production, and the sale price to the grid or other buyers. The system may also capture environmental data such as solar irradiance levels, panel temperatures, and weather conditions, as well as operational data like inverter efficiency and maintenance activities. This comprehensive data collection may provide a holistic view of the solar farm's performance and market interactions.

Steps 504-510 may involve storing and securing this solar-specific data on the blockchain. LCOE calculations for the solar farm, considering factors such as panel degradation rates, maintenance costs, and local market prices for solar energy, may be recorded along with profitability predictions. The system may secure compliance data related to renewable energy credits and emissions reductions achieved by the solar farm. Through a consensus mechanism, these records may be validated and added to the blockchain, creating an immutable history of the solar farm's financial and operational performance. In steps 512-516, the method may update smart contracts based on the solar farm's LCOE and risk assessments, potentially automating adjustments to energy pricing or triggering maintenance activities based on performance metrics. The blockchain may enable an auditable history of the solar farm's LCOE and profitability, allowing stakeholders such as investors or regulators to review historical performance and trends in solar energy production costs and revenues. Finally, the system may facilitate secure sharing of relevant data with stakeholders, such as providing real-time production data to grid operators or financial performance metrics to investors, while maintaining the confidentiality of sensitive information.

Figure 6:
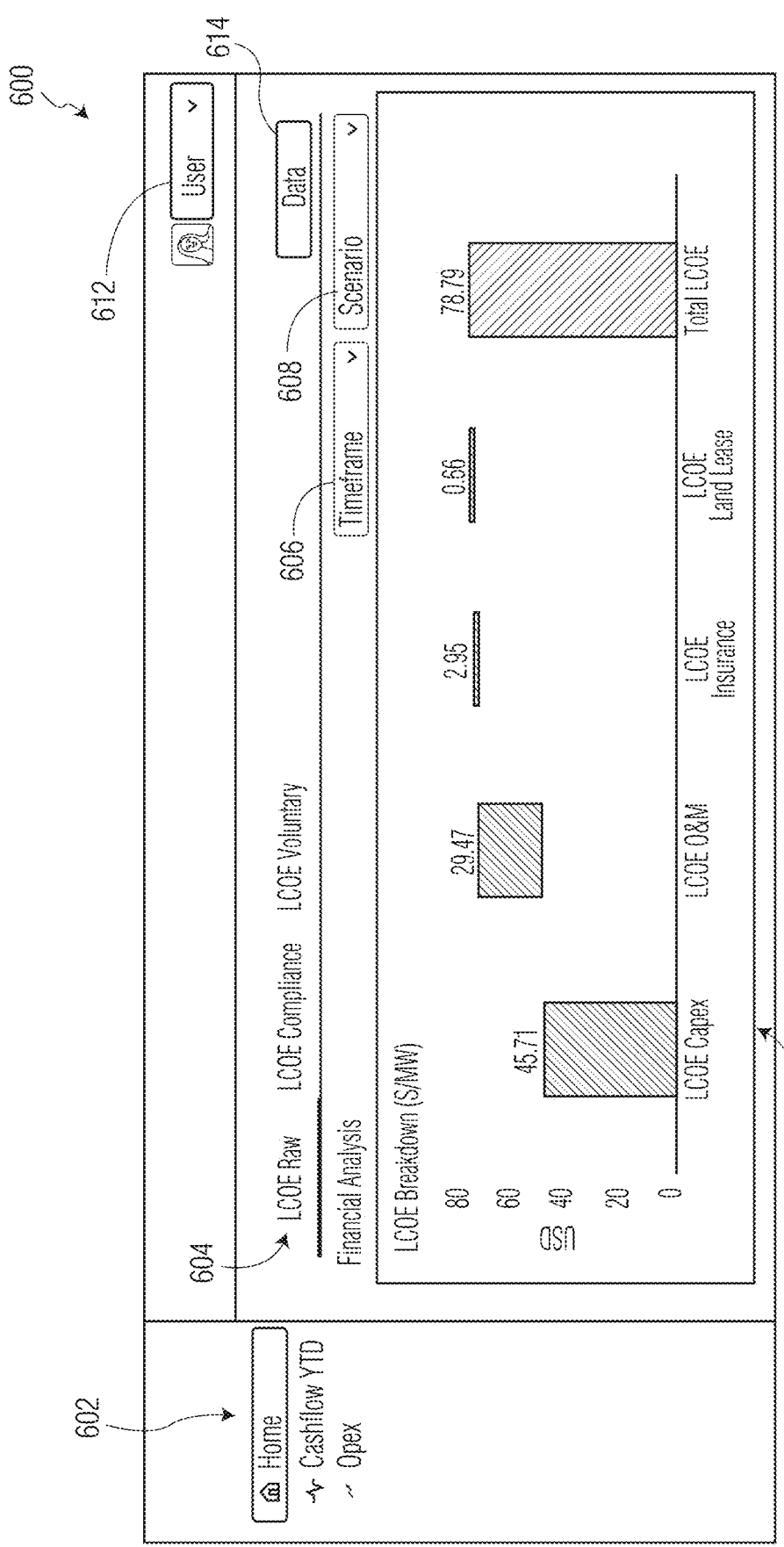
FIG. 6 illustrates a screen shot for a Levelized Cost of Energy analysis system, according to aspects of the present disclosure.

Referring to FIG. 6, a screen shot 600 of a user interface for a LCOE analysis system is illustrated. The screen shot 600 may provide a visual representation of various components that allow users to interact with and analyze LCOE data in real-time. The screen shot 600 may include a navigation menu 602, LCOE analysis section 604, timeframe selector 606, scenario selector 608, LCOE breakdown chart 610, user profile selector 612, and data button 614.

In some aspects, the screen shot 600 may include a navigation menu 602 positioned on the left side of the interface. The navigation menu 602 may contain options such as "Home," "Cashflow YTD," and "Opex," allowing users to navigate between different sections of the system.

The navigation menu 602 may serve as a central hub for accessing various features and functionalities of the LCOE analysis system. In some implementations, it may be designed with an intuitive layout to enhance user experience and facilitate efficient navigation. The menu options may be customizable, allowing administrators to add or remove items based on specific user roles or system requirements. Additionally, the navigation menu 602 may include visual indicators, such as highlighting or icons, to show the currently active section, helping users maintain context as they move through different parts of the interface. This organizational structure may contribute to a more streamlined workflow, potentially improving productivity for users analyzing complex LCOE data and energy production metrics.

To the right of the navigation menu 602, the screen shot 600 may display an LCOE analysis section 604. This section may present different LCOE categories, which may include "LCOE Raw," "LCOE Compliance," and "LCOE Voluntary." These categories may allow users to analyze LCOE data from various perspectives, taking into account different market conditions and regulatory requirements.

In some implementations, the LCOE analysis section 604 may provide interactive features that allow users to drill down into specific LCOE components. For example, users may be able to click on individual categories to view detailed breakdowns of the costs contributing to each LCOE type. The system may also incorporate data visualization tools in this section, such as charts or graphs, to help users quickly grasp trends and patterns in the LCOE data across different categories. Additionally, the LCOE analysis section 604 may include comparative analysis features, allowing users to benchmark their LCOE values against industry standards or historical performance. This comprehensive approach to LCOE analysis may enable users to make more informed decisions about energy production strategies and identify areas for potential cost optimization.

The screen shot 600 may include a timeframe selector 606 and a scenario selector 608. These dropdown menus may allow users to adjust the time period and scenario for the LCOE analysis. In some implementations, users may be able to select specific date ranges or predefined time periods, as well as choose from various operational or market scenarios to analyze their impact on LCOE.

The timeframe selector 606 and scenario selector 608 may provide users with flexibility in analyzing LCOE data across different temporal and operational contexts. For example, the timeframe selector 606 may offer options such as monthly, quarterly, or annual views, allowing users to examine LCOE trends over various time horizons. The scenario selector 608 may enable users to model different operational conditions, such as changes in energy demand, fuel prices, or regulatory environments. By adjusting these parameters, users may gain insights into how LCOE varies under different circumstances, potentially informing strategic decision-making and long-term planning for energy production and distribution.

A central feature of the screen shot 600 may be the LCOE breakdown chart 610. This bar graph may display the breakdown of LCOE components in USD per megawatt ($/MW). The chart may show several categories, which may include "LCOE Capex," "LCOE O&M," "LCOE Insurance," "LCOE Land Lease," and "Total LCOE." Each bar in the chart may represent a different cost component, with the total LCOE displayed as the rightmost bar.

In some cases, the LCOE breakdown chart 610 may be interactive, allowing users to hover over or click on specific bars to view detailed information about each cost component. The chart may also update dynamically based on the selected timeframe and scenario, providing real-time visualization of how different factors affect the LCOE.

The LCOE breakdown chart 610 may provide users with valuable insights into the relative contributions of different cost factors to the overall LCOE. By visually representing these components, users may quickly identify which areas have significant impact on the total cost of energy production. This information may be useful for decision-makers in identifying potential areas for cost reduction or optimization. Additionally, the chart may help users understand how changes in various cost components, such as fluctuations in O&M expenses or insurance costs, may affect the overall LCOE. This dynamic visualization may enable more informed strategic planning and financial analysis in the context of energy production economics.

The screen shot 600 may also include a user profile selector 612 in the top right corner, allowing users to switch between different profiles or access account-specific information. Adjacent to the user profile selector 612, there may be a data button 614, which may provide access to additional data or functions related to the LCOE analysis.

In some implementations, the user profile selector 612 may allow users to customize their view of the LCOE analysis based on their role or preferences. For example, a financial analyst may have access to more detailed cost breakdowns, while an operations manager may see more information related to production metrics. The data button 614 may open a dropdown menu or separate window with options to export data, generate reports, or access historical LCOE information. This additional functionality may enhance the user's ability to perform in-depth analysis and make informed decisions based on the LCOE data presented in the interface.

Figure 7:
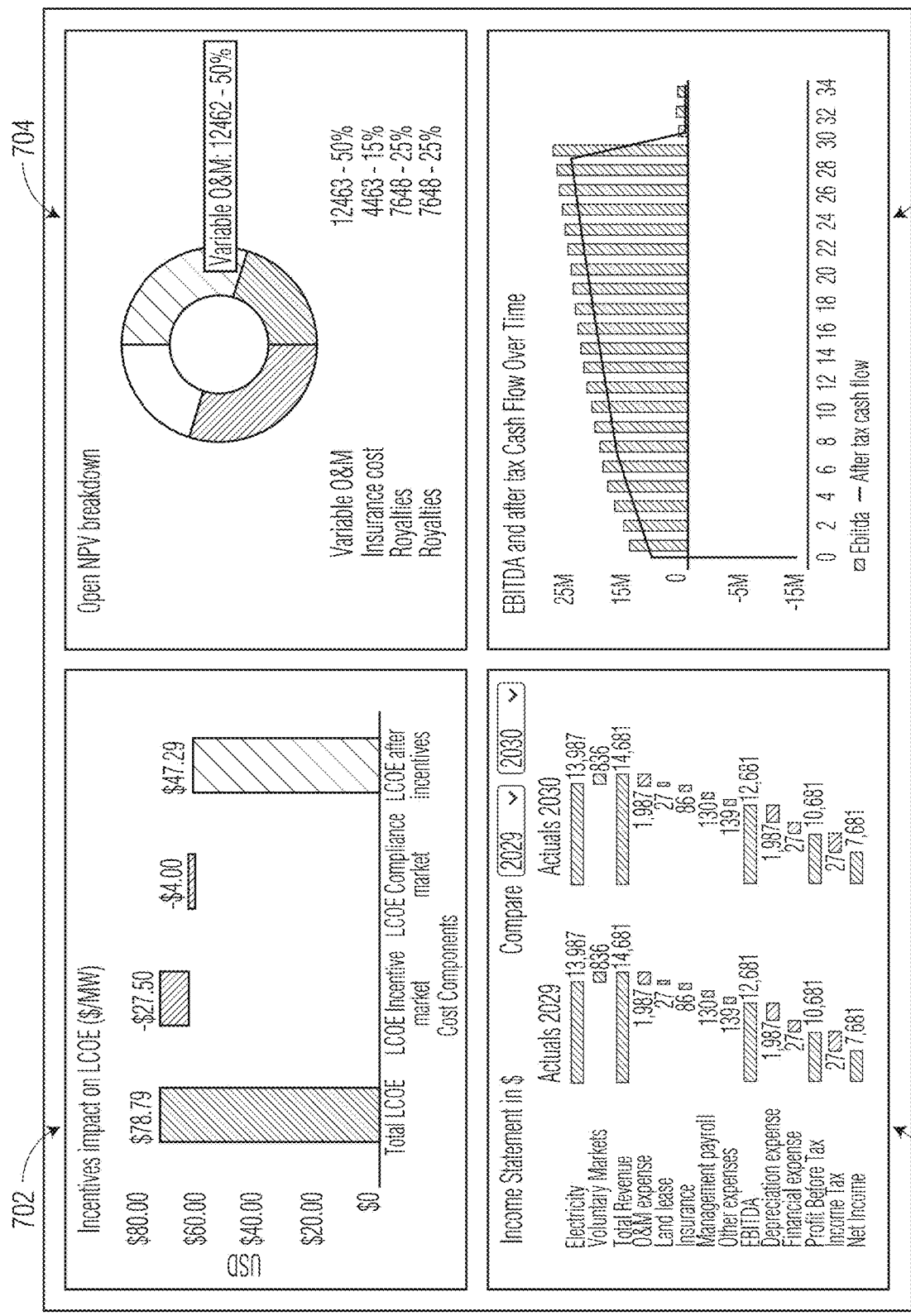
FIG. 7 illustrates a screen shot for real-time economic modeling and optimization of energy production, according to aspects of the present disclosure.

Referring to FIG. 7, a screen shot 700 of a user interface for real-time economic modeling and optimization of energy production is illustrated. The screen shot 700 may provide a comprehensive view of various financial and operational aspects of an energy production system through multiple visualizations. FIG. 7 may include an incentives impact chart 702, an NPV breakdown chart 704, an income statement 706, and a cash flow chart 708.

In some aspects, the screen shot 700 may include an incentives impact chart 702. This chart may display the impact of various incentives on the LCOE in $/MW. The incentives impact chart 702 may show different LCOE values, such as total LCOE, LCOE incentive market, LCOE compliance market, and LCOE after incentives. This visualization may allow users to quickly assess how different incentive programs affect the overall cost of energy production.

In some implementations, the incentives impact chart 702 may provide additional details on specific incentive programs and their individual effects on LCOE. For example, it may break down federal, state, and local incentives separately, allowing users to understand the relative impact of each program. The chart may also include interactive elements, such as hover-over tooltips that display precise numerical values or percentage changes for each incentive category. Additionally, the incentives impact chart 702 may offer the ability to toggle different incentive scenarios on and off, enabling users to model various combinations of incentive programs and instantly see their cumulative effect on LCOE. This level of granularity and interactivity may enhance the user's ability to optimize incentive strategies and make informed decisions about energy production economics.

The screen shot 700 may also feature an NPV breakdown chart 704. This chart may present an Open NPV (Net Present Value) breakdown in a pie chart format. The NPV breakdown chart 704 may illustrate the distribution of various costs, which may include categories such as Variable O&M, Insurance cost, and Royalties. Each segment of the pie chart may be represented by a different color and labeled with its respective percentage, providing a clear visual representation of the relative contribution of each cost component to the overall NPV.

In some implementations, the NPV breakdown chart 704 may offer interactive features that allow users to explore the data in more detail. For example, users may be able to hover over or click on individual segments to view precise numerical values or additional information about each cost category. The chart may also include options to adjust the time horizon for the NPV calculation, allowing users to analyze how the cost distribution changes over different periods. Additionally, the NPV breakdown chart 704 may be dynamically linked to other components of the interface, such that changes in input parameters or market conditions are immediately reflected in the chart's visualization. This real-time updating capability may enhance the user's ability to understand the financial implications of various scenarios and make informed decisions about energy production strategies.

In some implementations, the screen shot 700 may include an income statement 706. This section may provide a comparative view of financial data for two different years, such as 2029 and 2030. The income statement 706 may display various financial metrics, which may include electricity revenue, voluntary markets revenue, total revenue, different types of expenses, EBITDA (Earnings Before Interest, Taxes, Depreciation, and Amortization), depreciation expense, financial expense, profit before tax, income tax, and net income. This detailed financial information may allow users to analyze the projected financial performance of the energy production system over time.

In some aspects, the income statement 706 may be interactive, allowing users to drill down into specific line items for more detailed information. For example, users may be able to click on the electricity revenue figure to view a breakdown by energy source or time period. The system may also provide the ability to toggle between different visualization options, such as bar charts or line graphs, to help users better understand trends and patterns in the financial data. Additionally, the income statement 706 may include features for scenario analysis, enabling users to adjust input parameters and immediately see the impact on projected financial performance. This functionality may assist in strategic planning and decision-making processes for energy production management.

The screen shot 700 may also feature a cash flow chart 708. This chart may display the EBITDA and after-tax Cash Flow Over Time. The cash flow chart 708 may present a graphical representation of the financial performance over an extended period, such as 34 time units. The chart may use different colors or line styles to distinguish between EBITDA and after-tax cash flow, allowing users to visualize and compare these two beneficial financial metrics over time.

In some implementations, the cash flow chart 708 may include interactive features that allow users to zoom in on specific time periods or hover over data points to view detailed information. The chart may also provide options to toggle between different time scales, such as monthly, quarterly, or annual views, enabling users to analyze trends at various levels of granularity. Additionally, the cash flow chart 708 may incorporate forecasting capabilities, potentially using historical data and ML algorithms to project future cash flows and EBITDA. This predictive element may assist users in making informed decisions about future investments or operational changes based on anticipated financial performance.

In some aspects, the visualizations presented in the screen shot 700 may be interactive. Users may be able to hover over or click on specific elements of the charts to view more detailed information. The interface may also allow users to adjust parameters or select different scenarios to see how these changes affect the various financial metrics and visualizations.

The comprehensive view provided by the screen shot 700 may enable users to make informed decisions about energy production management. By presenting information on incentives, NPV, income, and cash flow in a single interface, the system may allow users to quickly assess the financial health and prospects of the energy production system. This integrated approach to data visualization may support more effective strategic planning and operational decision-making in the context of real-time economic modeling and optimization of energy production.

Figure 8:
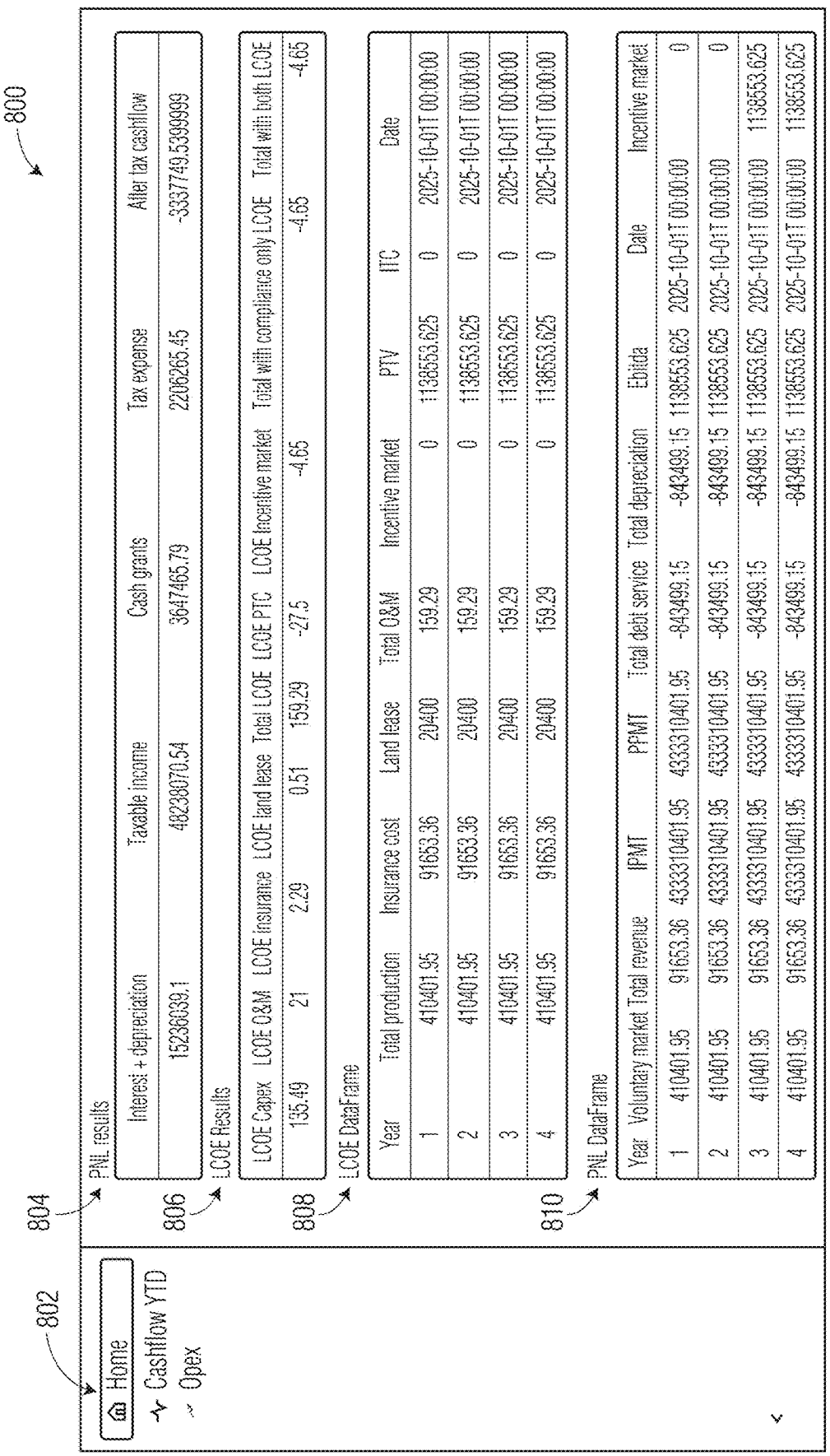
FIG. 8 illustrates another screen shot for real-time economic modeling and optimization of energy production, according to aspects of the present disclosure.

Referring to FIG. 8, a screen shot 800 of a user interface for real-time economic modeling and optimization of energy production is illustrated. The screen shot 800 may provide a comprehensive view of various financial and operational aspects of an energy production system through multiple data visualizations and tables. The screen shot 800 may include a navigation menu 802, PNL results 804, LCOE results 806, LCOE dataframe 808, and PNL dataframe 810, providing a comprehensive view of financial and operational data for energy production optimization.

In some aspects, the screen shot 800 may include a navigation menu 802 positioned on the left side of the interface. The navigation menu 802 may contain options such as "Home," "Cashflow YTD," and "Opex," allowing users to navigate between different sections of the system.

The navigation menu 802 may serve as a central hub for accessing various features and functionalities of the LCOE analysis system. In some implementations, it may be designed with an intuitive layout to enhance user experience and facilitate efficient navigation. The menu options may be customizable, allowing administrators to add or remove items based on specific user roles or system requirements. Additionally, the navigation menu 802 may include visual indicators, such as highlighting or icons, to show the currently active section, helping users maintain context as they move through different parts of the interface. This organizational structure may contribute to a more streamlined workflow, potentially improving productivity for users analyzing complex LCOE data and energy production metrics.

To the right of the navigation menu 802, the screen shot 800 may display PNL results 804. This section may show financial data including interest and depreciation, taxable income, cash grants, tax expense, and after-tax cashflow. The PNL results 804 may provide users with a quick overview of the system's financial performance.

In some implementations, the PNL results 804 may be interactive, allowing users to drill down into specific line items for more detailed information. For example, users may be able to click on individual entries to view historical trends or comparative data. The system may also provide the ability to toggle between different visualization options, such as bar charts or line graphs, to help users better understand trends and patterns in the financial data. Additionally, the PNL results 804 may include features for scenario analysis, enabling users to adjust input parameters and immediately see the impact on projected financial performance. This functionality may assist in strategic planning and decision-making processes for energy production management.

Below the PNL results 804, LCOE results 806 may be presented. This section may provide a breakdown of the LCOE components, which may include LCOE Capex, LCOE O&M, LCOE insurance, LCOE land lease, Total LCOE, LCOE PTC, LCOE Incentive market, and total LCOE values for compliance and both markets. The LCOE results 806 may allow users to analyze the various factors contributing to the overall cost of energy production.

In some implementations, the LCOE results 806 may include interactive features that allow users to explore the data in more detail. For example, users may be able to hover over or click on individual LCOE components to view historical trends or comparative data across different time periods or scenarios. The system may also provide the ability to toggle between different visualization options, such as bar charts or line graphs, to help users better understand trends and patterns in the LCOE data. Additionally, the LCOE results 806 may incorporate sensitivity analysis capabilities, enabling users to adjust input parameters and immediately see the impact on the various LCOE components. This functionality may assist in strategic planning and decision-making processes for optimizing energy production costs and overall financial performance.

The screen shot 800 may also include an LCOE dataframe 808, which may present a table with yearly data on various operational and financial metrics. This table may include information such as total production, insurance cost, land lease, total O&M, incentive market, PTV, ITC, and corresponding dates. The LCOE dataframe 808 may provide users with a detailed view of how different factors affect the LCOE over time.

In some implementations, the LCOE dataframe 808 may be interactive, allowing users to sort, filter, or drill down into specific data points for more detailed analysis. The system may provide tooltips or pop-up windows with additional context when users hover over or click on individual entries. Additionally, the LCOE dataframe 808 may include visual elements such as conditional formatting or sparklines to highlight trends or anomalies in the data. This enhanced functionality may enable users to quickly identify patterns or issues that may impact LCOE calculations and overall project economics.

At the bottom of the screen shot 800, a PNL dataframe 810 may be displayed. This table may provide yearly financial data including voluntary market total revenue, IPMT, PPMT, total debt service, total depreciation, EBITDA, dates, and incentive market values. The PNL dataframe 810 may offer a comprehensive view of the system's financial performance over an extended period.

In some implementations, the PNL dataframe 810 may be interactive, allowing users to sort, filter, or drill down into specific data points for more detailed analysis. The system may provide tooltips or pop-up windows with additional context when users hover over or click on individual entries. Additionally, the PNL dataframe 810 may include visual elements such as conditional formatting or sparklines to highlight trends or anomalies in the financial data. This enhanced functionality may enable users to quickly identify patterns or issues that may impact the system's overall financial performance and profitability. The ability to interact with and visualize the data in various ways may support more effective decision-making and strategic planning in the context of real-time economic modeling and optimization of energy production.

The comprehensive view provided by the screen shot 800 may enable users to make informed decisions about energy production management. By presenting detailed financial and operational data in a single interface, the system may allow users to quickly assess the performance and prospects of the energy production system. This integrated approach to data visualization and analysis may support more effective strategic planning and operational decision-making in the context of real-time economic modeling and optimization of energy production.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the presented example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A system for real-time economic modeling and optimization for integrated power generation and distribution, comprising:
    a controller configured to collect real-time multi-frequency data from multiple energy sources and IoT sensors;
    an database configured to integrate the collected data with energy production cost components and market information and weather information from external data sources; and
    a processing server comprising a physics-based model and a machine learning model, configured to;
        apply the physics-based model to the integrated data to simulate energy production processes and establish baseline Levelized Cost of Energy (LCOE) estimates,
        apply the machine learning model to the integrated data to refine the baseline LCOE estimates by identifying patterns in historical operational data and current market conditions, and calculate real-time LCOE based on current operational expenditure (OPEX) and market conditions, predict profitability, and assess risk, and
        generate operational adjustment recommendations for the energy production based on at least one of the LCOE and predicted profitability.

2. The system of claim 1, wherein the controller is configured to collect data from renewable energy sources comprising at least one of natural gas, solar, and geothermal power generation.

3. The system of claim 1, wherein the database is configured to integrate data related to capital expenditure (CAPEX), operations and maintenance (O&M) costs, insurance costs, and land lease costs.

4. The system of claim 1, wherein the processing server is configured to apply energy production principles in the physics-based model and utilize classification, pattern recognition, and prediction techniques in the machine learning model.

5. The system of claim 1, wherein the processing server is configured to dynamically update the LCOE calculation based on real-time changes in operational conditions and measured production performance and market prices.

6. The system of claim 1, wherein the processing server is configured to generate profitability forecasts including the dynamic impact over time from both compliance and voluntary financial markets.

7. The system of claim 1, wherein the processing server is configured to provide real-time operational adjustments to optimize the energy production and distribution based on year-to-date market conditions.

8. The system of claim 1, processing server is configured to evaluate operational risk for insurance premium calculations.

9. The system of claim 8, wherein the processing server is further configured to monitor operational risks and develop strategies based on real-time operational performance and environmental direct measurements data.

10. The system of claim 1,
    wherein the processing server is configured to record a history of the LCOE and the predicted profitability relative to the integrated data and enable smart contracts that automatically update based on new LCOE calculations and risk assessments.

11. A method for real-time economic modeling and optimization for integrated power generation and distribution, comprising:
    collecting real-time multi-frequency data from multiple energy sources and IoT sensors;
    integrating the collected data with energy production cost components and market information and weather information from external data sources;

processing the integrated data by:
  applying a physics-based model to the integrated data to simulate energy production processes and establish baseline Levelized Cost of Energy (LCOE) estimates,
  applying a machine learning model to the integrated data to refine the baseline LCOE estimates by identifying patterns in historical operational data and current market conditions, calculating real-time LCOE based on current operational expenditure (OPEX) and market conditions,
  predicting profitability and assessing risk; and
generating operational adjustment recommendations for the energy production based on at least one of the LCOE and predicted profitability.

12. The method of claim 11, wherein collecting data comprises collecting the data from renewable energy sources comprising at least one of solar, natural gas, and geothermal power generation.

13. The method of claim 11, wherein integrating data comprises integrating the data related to capital expenditure (CAPEX), operations and maintenance (O&M) costs, insurance costs, and land lease costs.

14. The method of claim 11, wherein analyzing the integrated data comprises applying energy production principles in the physics-based model and utilizing classification, pattern recognition, and prediction techniques in the machine learning model.

15. The method of claim 11, further comprising dynamically updating the LCOE calculation based on real-time changes in operational conditions and measured production performance and market prices.

16. The method of claim 11, further comprising generating profitability forecasts including the dynamic impact over time from both compliance and voluntary financial markets.

17. The method of claim 11, wherein generating the operational adjustment recommendations comprises providing real-time operational adjustments to optimize the energy production and distribution based on year-to-date market conditions.

18. The method of claim 11, further comprising evaluating operational risk for insurance premium calculations.

19. The method of claim 18, further comprising monitoring operational risks and developing strategies based on real-time operational performance and environmental direct measurements data.

20. The method of claim 11, further comprising:
  recording a history of the LCOE and the predicted profitability relative to the integrated data using a blockchain; and
  enabling smart contracts that automatically update based on new LCOE calculations and risk assessments using the blockchain.

* * * * *